United States Patent
Orth et al.

(10) Patent No.: US 7,780,759 B2
(45) Date of Patent: Aug. 24, 2010

(54) DIRECT REDUCTION PROCESS

(75) Inventors: Andreas Orth, Friedrichsdorf (DE); Heinz Eichberger, Bad Soden (DE); Donald Keith Philp, Bibra Lake, WA (US); Jeantine Van Gemund, legal representative, Bibra Lake, WA (US); Rod Dry, City Beach, WA (US)

(73) Assignee: Outotec Oyj, Espoo (FI)

( * ) Notice: Subject to any disclaimer, the term of this patent is extended or adjusted under 35 U.S.C. 154(b) by 455 days.

(21) Appl. No.: 11/569,740

(22) PCT Filed: May 20, 2005

(86) PCT No.: PCT/EP2005/005465

§ 371 (c)(1),
(2), (4) Date: Feb. 26, 2008

(87) PCT Pub. No.: WO2005/116274

PCT Pub. Date: Dec. 8, 2005

(65) Prior Publication Data

US 2008/0229881 A1    Sep. 25, 2008

(30) Foreign Application Priority Data

May 31, 2004    (AU) .............................. 2004902898

(51) Int. Cl.
C21B 13/02    (2006.01)
(52) U.S. Cl. .............................. 75/387; 75/447; 75/453
(58) Field of Classification Search .................. 75/744, 75/444, 448, 451, 452, 453, 387, 447
See application file for complete search history.

(56) References Cited

U.S. PATENT DOCUMENTS 3,642,060 A * 2/1972 Hlinka ........................ 165/47

(Continued)

FOREIGN PATENT DOCUMENTS

JP    6145749    5/1994

OTHER PUBLICATIONS

Schlebusch W: "Progress in Direct Reduction Technology from the Aspect of the Plant Contractor," MPT. Metallurgical Plant and Plant and Technology International, Verlag Stahleisen, Duesseldorf, Germany, vol. 20, No. 5, Oct. 1997, pp. 48-50, 52, 55.

Primary Examiner—Roy King
Assistant Examiner—Tima M McGuthry-Banks
(74) Attorney, Agent, or Firm—Chernoff, Vilhauer, McClung & Stenzel LLP

(57) ABSTRACT

A direct reduction process for a solid metalliferous material having a particle size distribution that at least in part contains micron sized particles includes supplying the metalliferous material, a solid carbonaceous material, an oxygen-containing gas, and a fluidizing gas into a fluidized bed in a vessel and maintaining the fluidized bed in the vessel, at least partially reducing metalliferous material in the vessel, and discharging a product stream that comprises the partially reduced metalliferous material from the vessel. The process includes (a) establishing and maintaining a carbon-rich zone within the fluidized bed; (b) passing metalliferous material, including metallized material (which term includes partially metallized material), through the carbon-rich zone; and (c) injecting the oxygen-containing gas into the carbon-rich zone and oxidizing metallized material, solid carbonaceous material and other oxidizable solids and gases and causing controlled agglomeration of particles.

33 Claims, 1 Drawing Sheet

U.S. PATENT DOCUMENTS

Figure 1:
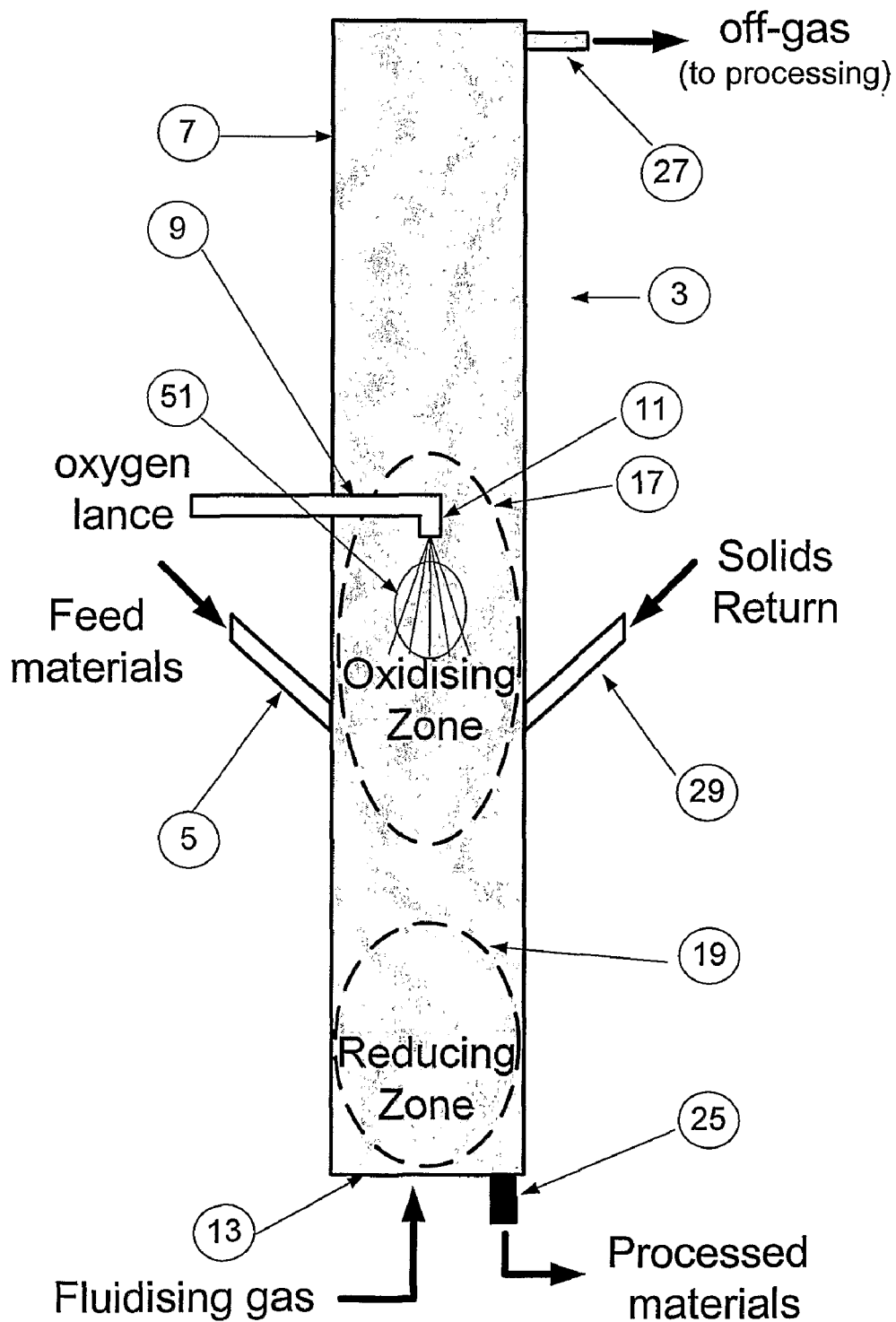

| | | | |
|---|---|---|---|
| 3,928,021 A | * 12/1975 | Matsubara et al. | 75/448 |
| 4,224,056 A | 9/1980 | Tomizawa et al. | |
| 4,359,212 A | * 11/1982 | Bengtsson et al. | 266/172 |
| 4,374,663 A | 2/1983 | Collin et al. | |
| 4,539,188 A | * 9/1985 | Hirsch et al. | 423/210 |
| 5,603,748 A | * 2/1997 | Hirsch et al. | 75/436 |

* cited by examiner

DIRECT REDUCTION PROCESS

This is a national stage application filed under 35 USC 371 based on International Application No. PCT/EP2005/005465 filed May 20, 2005, and claims priority under 35 USC 119 of Australian Patent Application No. 2004902898 filed May 31, 2004.

The present invention relates to a direct reduction process for a metalliferous feed material, particularly, although by no means exclusively, to a direct reduction process for an iron-containing feed material, such as iron ore.

The present invention also relates to a process for reducing a metalliferous feed material that comprises a direct reduction process for partially reducing metalliferous feed material in the solid state and a smelting process for melting and further reducing the partially reduced metalliferous feed material to a molten metal.

The present invention was made during the course of an on-going research project carried out by the applicant to develop the so called "CIRCOFER technology" for the direct reduction of iron ore.

CIRCOFER technology is a direct reduction process that is capable of reducing iron ore in the solid state to a metallisation of 50% or higher.

CIRCOFER technology is based on the use of fluidised beds. The main feed materials to the fluidised beds are fluidising gas, metal oxides (typically iron ore fines), solid carbonaceous material (typically coal) and oxygen-containing gas (typically oxygen gas). The main product produced in the fluidised beds is metallised metal oxides, i.e. metal oxides that have been at least partially reduced.

One of the findings of the applicant in the research project is that it is possible to operate the process with relatively fine feed materials and minimise carry-over of iron units in an off-gas stream from the process and minimise undesirable accretions of materials, such as metal oxide fines, on exposed surfaces in the fluidised bed apparatus that are capable of disrupting the process. High carry-over of iron units in off-gas streams and undesirable accretions on exposed apparatus surfaces are significant issues for commercialisation of the CIRCOFER technology, particularly with metal oxide feed materials that are relatively brittle.

The applicant has found that it is possible to achieve controlled agglomeration of particles and minimise undesirable accretions of materials, such as metal oxides, by providing a carbon-rich zone in a fluidised bed, passing metalliferous material through the zone, and injecting oxygen into the zone and oxidising smaller particles, including smaller metallised particles.

According to the present invention there is provided a direct reduction process for a solid metalliferous material having a particle size distribution that at least in part comprises micron sized particles, which process comprises supplying the metalliferous material, a solid carbonaceous material, an oxygen-containing gas, and a fluidising gas into a fluidised bed in a vessel and maintaining the fluidised bed in the vessel, at least partially reducing metalliferous material in the vessel, and discharging a product stream that comprises the at least partially reduced metalliferous material from the vessel, which process is characterised by: (a) establishing and maintaining a carbon-rich zone within the fluidised bed; (b) passing metalliferous material, including metallised material (which term includes partially metallised material), through the carbon-rich zone; and (c) injecting the oxygen-containing gas into the carbon-rich zone and oxidising metallised material, solid carbonaceous material and other oxidisable solids and gases and causing controlled agglomeration of particles.

The term "carbon-rich" zone is understood herein to mean a region in the fluidised bed in which there is a relatively large amount of carbon-containing material in relation to the amount of metalliferous material than there is in other regions of the fluidised bed.

The applicant does not have a totally clear understanding at this stage of the mechanism or mechanisms that enables controlled agglomeration of metalliferous material to be achieved. Nevertheless, without wishing to be bound by the following comments, in the research project the applicant observed that the agglomerates that formed comprise smaller particles, particularly fines, adhered to each other and to larger particles. The applicant speculates that the conditions in the carbon-rich zone, and more particularly a hot zone within the carbon-rich zone, are such that (a) micron sized partially and completely reduced, i.e. metallised, iron ore particles react with oxygen and generate heat and the resultant oxidised particles become sticky (b) fine coal particles react with oxygen and oxidise and the resultant ash becomes sticky; and (c) fine iron ore particles become sticky as a consequence of being heated. The applicant also speculates that these smaller sticky particles, adhere to larger particles that have a higher heat sink capacity, with the overall beneficial result that there is a reduction in the proportion of smaller particles in the vessel that can adhere to apparatus surfaces and be carried out from the vessel in an off-gas stream.

Preferably the process comprises supplying the metalliferous material in the form of fines.

In the case of reducing metalliferous material in the form of iron ore fines, preferably the fines are sized at minus 6 mm.

Preferably the fines have an average particle size in the range of 0.1 to 0.8 mm.

One of the advantages of the process is that it can accept a substantial amount of metalliferous feed material with a grain size of less than 100 microns without a significant amount of this material exiting the process entrained in off-gas. This is believed to be due to an agglomeration mechanism operating within the fluidised bed that promotes a desirable level of agglomeration between particles of feed materials, particularly sub-100 micron particles, without appearing to promote uncontrolled agglomeration capable of interrupting operation of the fluidised bed. Similarly, friable ores that have a tendency to break down during processing and to thereby increase the proportion of particles in the fluidised bed with a size of less than 100 microns may be processed without significant loss of feed material in process off-gas.

Preferably the process comprises supplying the metalliferous material with a selected maximum particle size and controlling agglomeration so that 90% of the particles discharged from the process as a product stream do not exceed the maximum selected feed size.

Preferably the process comprises supplying the metalliferous material with a selected maximum particle size and controlling agglomeration so that no more than 30%, preferably no more than 20%, and more preferably no more than 10% by weight of the total weight of iron units discharged from the process is carried off in an off-gas stream from the process.

Preferably the process comprises controlling agglomeration by adjusting the feed rates of any one or more of the metalliferous material, the carbonaceous material, the reaction temperature and the oxygen-containing gas.

More preferably the process comprises controlling agglomeration by adjusting the feed rate of the carbonaceous material.

The process has considerable advantages.

By way of example, it has hitherto been thought that CIRCOFER technology requires amounts of carbon that are at least 20-30% by weight of the total weight of solids in a fluidized bed to prevent uncontrolled agglomeration leading to undesirable accretions on exposed surfaces of fluidized bed apparatus that disrupts the process.

The applicant has found that it is possible to operate the process with minimal undesirable accretions and with desirable controlled agglomeration with relatively low levels, typically 5-30%, of carbonaceous material. Low levels of carbonaceous material means that it is possible to produce a solids product stream with low levels of char and the product stream can be supplied into smelters with minimal downstream processing.

In addition, controlled agglomeration of metalliferous material fines into larger particles that become part of the solid products stream rather than being carried out of the process as entrained solids in an off-gas stream means that there is higher recovery from the process and less downstream treatment of off-gas required. This is a particularly important benefit for iron ores that tend to be brittle and would break down into micron sized particles in the course of materials handling prior to being supplied to the vessel and during the course of being processed in the vessel. Such brittle ores include ores mined in Western Australia, such as Brockman and Mara Maba ores.

On current indications, typically the process can reduce minus 3 mm iron ore fines with the following results.

At least 90% by weight of the iron ore fines supplied to the process being metallised to some extent and discharged as part of a solids product stream, with less than 50% of the fines being greater than 2 mm.

In the range of 5-30% by weight of the solids product stream comprising carbon.

Less than 20% by weight of the iron ore fines supplied to the process being discharged from the process with off-gas.

Preferably the process comprises injecting the oxygen-containing gas into a central region of the vessel, ie a region that is located inwardly of a side wall of the vessel. Preferably the process comprises injecting the oxygen-containing gas so that there is a downward flow of the gas in the vessel.

Preferably the process comprises injecting the oxygen-containing gas with a downward flow in a range of plus or minus 40 degrees to the vertical.

More preferably the process comprises injecting the oxygen with a downward flow in a range of plus or minus 15 degrees to the vertical.

Preferably the process comprises injecting the oxygen-containing gas via at least one lance having a lance tip with an outlet positioned in the vessel inwardly of the side wall of the vessel in the central region of the vessel.

Preferably the lance tip is directed downwardly.

More preferably the lance tip is directed vertically downwardly.

The position of the lance and, more particularly, the height of the outlet of the lance tip, is determined by reference to factors, such as the oxygen-containing gas injection velocity, the vessel pressure, the selection and amounts of the other feed materials to the vessel, and the fluidised bed density.

Preferably the process comprises water-cooling the lance tip to minimise the possibility of accretions forming on the lance tip that could block the injection of the oxygen-containing gas.

Preferably the process comprises water cooling an outer surface of the lance.

Preferably the process comprises injecting the oxygen-containing gas through a central pipe of the lance.

Preferably the process comprises injecting the oxygen-containing gas with sufficient velocity to form a substantially solids-free zone in the region of the outlet of the lance tip to minimise the formation of accretions that could block the injection of the oxygen-containing gas.

Preferably the oxygen is injected with a velocity in the range 50-300 m/s.

Preferably the process comprises injecting nitrogen and/or steam and/or other suitable shrouding gas and shrouding the region of the outlet of the lance tip to minimise oxidation of metal that could result in accretions forming on the lance tip that could block the injection of the oxygen-containing gas.

Preferably the process comprises injecting the shrouding gas into the vessel at a velocity that is at least 60% of the velocity of the oxygen-containing gas.

In one embodiment the process comprises establishing reaction zones in a fluidised bed and moving solids (including metalliferous and carbonaceous materials) and fluidising gas within the bed so that the solids pass through the reaction zones.

The reaction zones may be contiguous.

One reaction zone is the carbon-rich zone described above.

The other reaction zone is a metal-rich zone in which metalliferous material, such as iron ore, is reduced in a solid state.

The term "metal-rich" zone is understood herein to mean a region in the fluidised bed in which there is a relatively large amount of metalliferous material in relation to the amount of carbon-containing material than there is in other regions of the fluidised bed.

The metal-rich zone is located in a lower section of the fluidised bed and the carbon-rich zone is located above the metal-rich zone.

The zones may be contiguous.

The fluidised bed comprises upward and downward movement of solids through the zones.

Preferably the process comprises supplying the metalliferous material, the carbonaceous material, the oxygen-containing gas, and the fluidising gas to the fluidised bed and maintaining the fluidised bed with (a) a downward flow of the oxygen-containing gas, (b) an upward flow of solids and fluidising gas countercurrent to the downward flow of the oxygen-containing gas, and (c) a downward flow of solids outwardly of the upward flow of solids and fluidising gas.

In the fluidised bed described in the preceding paragraph, solids in the upward and downward flows of solids are heated by heat generated by reactions between the oxygen-containing gas, the carbonaceous material and other oxidisable materials (such as CO, volatiles, and $H_2$) in the carbon-rich zone. The solids in the downward flow of solids transfer heat to the metal-rich zone.

In addition, the upward and downward flows of solids shield the side wall of the vessel from radiant heat generated by reactions between the oxygen-containing gas and the solid carbonaceous material and other oxidisable solids and gases in the fluidised bed.

Preferably the carbonaceous material is coal. In such a situation, the process devolatilises the coal to char and at least part of the char reacts with oxygen and forms CO in the fluidised bed. Coal volatiles also decompose to gases such as CO and $H_2$, which in turn may further react with oxygen in the fluidised bed.

Preferably the fluidising gas comprises a reducing gas, such as CO and $H_2$.

Preferably the process comprises selecting the amount of $H_2$ in the fluidising gas to be at least 15% by volume of the total volume of CO and $H_2$ in the gas.

Preferably the process comprises discharging the product stream comprising at least partially reduced metalliferous material from the lower section of the vessel.

Preferably the product stream also comprises other solids (for example char).

Preferably the process comprises separating at least a portion of the other solids from the product stream.

Preferably the process comprises returning at least a portion of the other solids to the vessel.

Preferably the process comprises discharging an off-gas stream containing entrained solids from an upper section of the vessel.

Preferably the process comprises separating at least a portion of the entrained solids from the off-gas stream.

Preferably the process comprises maintaining a circulating fluidised bed by separating entrained solids from the off-gas stream and returning at least a portion of the separated solids to the vessel.

Preferably the process comprises returning solids separated from the off-gas to the lower section of the fluidised bed.

Preferably the process comprises preheating metalliferous feed material with the off-gas from the vessel.

Preferably the process comprises treating the off-gas after the preheating step and returning at least a portion of the treated off-gas to the vessel as the fluidising gas.

Preferably the off-gas treatment comprises one or more of (a) solids removal, (b) cooling, (c) $H_2O$ removal; (d) $CO_2$ removal, (e) compression, and (f) reheating.

Preferably the off-gas treatment comprises returning solids to vessel.

The process may be operated to produce a product stream ranging from low to high metallisation depending on the downstream requirements for the at least partially reduced metalliferous material. The metallisation may range from 30 to in excess of 80%. In situations in which metallisation greater than 50% is required, preferably the process comprises operating with reducing gas in the fluidising gas. One option for the fluidising gas in this instance is treated off-gas from the vessel. In situations in which metallisation less than 50% is required, it is envisaged that it will not be necessary to operate with reducing gas in the fluidising gas and sufficient reductant can be obtained via solid carbonaceous material supplied to the process.

The oxygen-containing gas may be any suitable gas.

Preferably the oxygen-containing gas comprises at least 90% by volume oxygen.

The present invention is described further with reference to the accompany drawing which is a diagram of an apparatus for direct reduction of a metalliferous material by one embodiment of a process in accordance with the present invention which illustrates the reaction zones formed by the process within the vessel shown in the FIGURE.

The following description is in the context of direct reduction of metalliferous material in the form of iron ore in the solid state. The present invention is not so limited and extends to direct reduction of other iron-containing materials (such as ilmenite) and more generally to other metalliferous materials.

The following description is also in the context of direct reduction of iron ore with coal as a solid carbonaceous material, oxygen as an oxygen-containing gas, and recycled off-gas containing a mixture of CO and $H_2$ as a fluidising gas. The present invention is not so limited and extends to the use of any other suitable solid carbonaceous material, oxygen-containing gas, and fluidising gas.

With reference to the FIGURE, solid feed materials, namely iron ore (typically fines sized to less than 6 mm) and coal, oxygen and fluidising gas are supplied to the vessel 3 shown in the FIGURE and establish a fluidised bed in the vessel.

The solid feed materials are supplied to the vessel via a solids delivery device such as a screw feed or a solids injection lance 5 that extends through a side wall 7 of the vessel.

The oxygen is injected into the vessel via a lance 9 that has a lance tip 11 with an outlet that directs the oxygen downwardly in a central region of the vessel, ie spaced inwardly from the side wall 7 of the vessel. The lance tip is directed downward in the vessel. The fluidising gas is injected via a series of tuyeres or nozzles (not shown) in a base 13 of the vessel.

The above-described supply of solids and gases produces the following reactions in the vessel.

Devolatilisation of coal fines to char and decomposition of coal volatiles to gaseous products (such as CO and $H_2$) and reaction of at least part of the char with oxygen to form CO.

Direct reduction of iron ore to at least partially reduced iron by the CO, $H_2$, which reactions produce $CO_2$ and $H_2O$.

Reaction of $CO_2$ with carbon to form CO (Boudouard reaction).

Oxidation of solids and gases, such as partially reduced iron ore particles, char, coal volatiles, $CO_2$ and $H_2$ (injected as a part of the fluidising gas or produced through decomposition of coal volatiles) with oxygen which generates heat that assists with maintaining the reactions described in the preceding dot points and which also contributes to a desirable controlled agglomeration of the smaller reduced ore particles to form larger reduced ore particles.

The relative densities of the solids and the above-described injection of the solids and the gases, including the locations of the solids/gas injection, results in the formation of reaction zones in the vessel. The zones may be contiguous.

One reaction zone is a carbon-rich zone 17 in the region of the lance tip 11 of the lance 9, i.e. in an intermediate section of the vessel in terms of height. In this zone the pre-dominant reactions are oxidising reactions involving combustion of metallised material, char, coal volatiles, CO, and $H_2$ with oxygen which generate heat, particularly in a hot zone 51 in the immediate vicinity of the lance tip 11.

The other reaction zone is a metal-rich zone 19 in a lower section of the vessel in which (a) coal is devolatilised and forms char and coal volatiles and (b) iron ore fines are at least partially reduced and thereby metallised by CO and $H_2$.

The above-described supply of solids and gases produces an upward flow of fluidising gas and entrained solids in the central region of the vessel. Increasingly, as the solids move upwardly, the solids disengage from the upward stream of fluidising gas and flow downwardly in an annular region between the central region and the side wall of the vessel. Recirculated solids are either entrained again in the upward stream of fluidising gas or are discharged from the vessel. The movement of solids transports the solids through the hot zone 51 and the smaller particles, particularly metallised micron sized particles become sticky and adhere to other particles, particularly larger particles. As is indicated above, this agglomeration of smaller particles provides substantial advantages.

The upward stream of fluidising gas and entrained solids in the central region of the vessel 3 is countercurrent to the downward flow of oxygen gas and is believed to result in the entrainment of some of the solids in the oxygen gas. The interaction of the counter current flows of fluidising gas and oxygen is believed to limit the extent to which solids entrained in or passing through the oxygen flow can contact vessel surfaces and cause accretions. The formation of accretions is believed to be further limited due to the central location of the flow of oxygen gas within the vessel.

The above-described downward flow of solids in the annular region between the central region and the side wall facilitates transfer of heat from the carbon-rich zone to the metal-rich zone.

In addition, the downward flow of solids partially shields the side wall from direct exposure to radiant heat from the central region of the vessel.

The above-described process also produces a stream of off-gas and entrained solids that is discharged from the vessel via an outlet 27 in an upper section of the vessel.

The off-gas stream is processed by separating solids from the off-gas and returning the separated solids to the vessel via a solids return leg 29. Thereafter, the off-gas is treated by a series of steps including (a) removal of solids, (b) cooling the off-gas, (c) $H_2O$ removal, (d) $CO_2$ removal, (e) compression, and (f) reheating.

The treated off-gas is thereafter returned to the vessel as part of the fluidising gas.

The above-described process produces a stream of solids, including at least partially reduced iron ore and char, that is discharged from the vessel via an outlet 25 in the base of the vessel.

The solids stream may be processed by separating the at least partially reduced iron ore and at least part of the other solids. The other solids, predominantly char, may be returned to the vessel as a part of the solids feed for the process. The at least partially reduced iron ore is further processed as required. By way of example, the at least partially reduced iron ore may be supplied to a molten bath-based smelting vessel and smelted to molten iron, for example by a process such as the so called "Hismelt process".

As is indicated above, the present invention was made during the course of an on-going research project carried out by the applicant to develop CIRCOFER technology for the direct reduction of iron ore. The research project included a series of pilot plant runs on 350 mm diameter and 700 mm diameter pilot plant set-ups of the applicant.

The following discussion focuses on research work on the 700 mm diameter vessel pilot plant.

The pilot plant comprises an apparatus of the type shown in FIGS. 1 and 2. The pilot plant was operated as a circulating fluidised bed at atmospheric pressure. The vessel has a height of 10.7 m. An upper section of the vessel has a height of approximately 8.9 m and an internal diameter of 700 mm. A lower section of the vessel has a height of approximately 1.8 m and an internal diameter of 500 mm. This height of 1.8 m includes the height of a fluidising grate and a transition section between the 500 mm diameter and the 700 mm diameter sections. The vessel is refractory lined.

Off-gas from the vessel was processed to remove entrained solids by passing the off-gas successively through 3 cyclones connected in series. The first cyclone (cyclone 1) received off-gas directly from the vessel. Solids separated in the cyclone were returned to the vessel via a seal pot that provided for pressure sealing. The second cyclone (cyclone 2) received off-gas from cyclone 1. Solids separated in the cyclone were returned to the vessel via a direct return of solids (i.e. no seal pot). The third cyclone (cyclone 3) received off-gas from the second 2. Solids separated by cyclone 3 were not returned to the vessel.

After solids separation by the three cyclones, the off-gas was further treated by a radial flow scrubber, which further removed solids from the off-gas. These solids were concentrated by a thickener and then passed through a drum filter to produce thickener sludge.

Off-gas leaving the radial flow scrubber was then treated by a tube cooler that operated to dewater the off-gas by cooling it to within the range 10-30° C. Following treatment by the tube cooler, the off-gas was combusted.

The fluidised bed was fluidised by air during the initial stages of testing and was later fluidised by a mixture of nitrogen and hydrogen gas. As there were no provisions for processing and recycling the process off-gas, e.g. $CO_2$ removal and compression, it was not possible for it to be returned to the vessel as fluidising gas. In this regard, hydrogen gas was used to simulate the effect of using processed off-gas as fluidising gas.

In summary, the research work demonstrated the following:

The concept of a coal based fluidised bed reduction process with oxygen injection, producing a reduced product with metallisation levels of up to 78%.

Injecting oxygen into/or close to a fluidised bed with up to 42% metallic iron in the bed appears to be feasible without the formation of accretions.

The concept of simultaneously reducing iron ore and partially burning coal for energy in a single bed vessel appears to be feasible, at metallic iron loadings up to 48% in the product.

The position of the oxygen lance in the vessel is important because of the desirability of transferring the heat of oxidation back into the bed while minimising the level of iron reoxidation. The 4-m position is about right for the conditions tested.

High phosphorus Brockman iron ore was successfully fluidised and reduced without excessive dust make. (Brockman ore is a friable West Australian iron ore made available by Hamersley Iron Pty Ltd, Perth, Western Australia.)

Objectives of the Experimental Program:

The primary objective was to achieve stable operation for a significant amount of time with high phosphorus Brockman ore (−3 mm) and Blair Athol coal.

The plan was to operate with low iron ore feed (up to 20% in product discharge) for two days with the oxygen lance in a low position (1.9-m above the distributor plate (not shown in the FIGURE) of the vessel. The aim was then to operate for three days with high ore feed (up to 70% in the product) with the oxygen lance in an upper position (3.8-m above the distributor plate).

Start-Up:

The campaign started on the $9^{th}$ of Dec. 2003 at 0600 hrs with a gradual heat up of the 700-mm vessel (hereinafter also referred to as a "CFB") using alumina as the bed material. Once the target temperature was reached, coal and oxygen were introduced into the vessel at 1550 hrs. The oxygen rate was increased up to 105 $Nm^3$/hr while the coal rate was in the range 300-450 kg/hr.

Operation with Coal and Oxygen Dec. 10, 2003-Dec. 11, 2003

Operation with coal, air and oxygen was conducted on Dec. 10, 2003. The operation was very smooth with the system stabilising fairly quickly and the vessel maintaining its temperature of 900-930° C. without any problems.

The standard operating conditions during this period were as follows.

CFB temperature: 930° C. bottom and 900° C. top
Fluidising gas flowrate: 140 $Nm^3$/hr ($N_2$) and 300 $Nm^3$/hr (air)
Pressure drop CFB: 80-140 mbar
Oxygen flowrate: up to 100 $Nm^3$/hr
$N_2$ shield gas flowrate: 30 $Nm^3$/hr
Coal Feed Rate: 340-450 kg/hr A summary of the results is as follows:
Bed Discharge Rate: 100-160 kg/hr
Cyclone 3 Discharge: 10-14 kg/hr
Offgas Analysis

| | |
|---|---|
| $CO/CO_2$ | 12.8/8.7 = 1.47 |
| % $H_2$ | 7.6 |
| % $CH_4$ | 0.7 |

The discharge product was clean with only some small +2 mm pieces which looked like residual refractory material. The dust make was reasonably low with <10% of the discharge reporting to the final cyclone discharge.

Operation with Iron Ore (10-140 kg/hr), Coal and Oxygen (Lance 2-m Height) Dec. 10, 2003-Dec. 12, 2003

Dec. 10, 2003 2200-Dec. 11, 2003 0600: Iron Ore at 10 kg/hr

Iron ore (<3-mm) was introduced into the feed system at 2200 on Dec. 10, 2003 at a rate of 10 kg-hr. Hydrogen was also introduced into the fluidising gas at a rate of 20 $Nm^3$/hr to simulate use of processed off-gas as fluidising gas. The operation was smooth with the bed ΔP being maintained at about 100-120 mbar and the temperature profile having a range of only 10° C. between the bottom and the top of the bed.

The product appeared fine without any signs of accretions or agglomerates. However, on screening the product (at 2 mm) some larger scale type material was found but this was only a very small proportion of the overall product. The scale appeared to be made up of ash/char and probably formed on the walls of the vessel or distributor plate in the vessel.

The standard operating conditions and results during this period were as follows.
CFB temperatures: 930° C. bottom and 900° C. top
Fluidising gas flowrate: 350 $Nm^3$/hr ($N_2$) and 20 $Nm^3$/hr ($H_2$)
Pressure drop CFB: 100-130 mbar
Oxygen flowrate: 100-115 $Nm^3$/hr
$N_2$ shield gas flowrate: 30 $Nm^3$/hr
Coal Feed Rate: 280-360 kg/hr
Iron Ore Feed Rate: 10 kg/hr
A summary of the results is as follows:
Bed Discharge Rate: 125 kg/hr
Cyclone Discharge: 15 kg/hr
Offgas Analysis

| | |
|---|---|
| $CO/CO_2$ | 10.3/9.7 = 1.06 |
| % $H_2$ | 9.2 |
| % $CH_4$ | 2.0 |

Dec. 11, 2013 0600-Dec. 11, 2003 1200: Iron Ore at 20 kg/hr

The iron ore feed rate was increased up to 20 kg/hr at 0600 on Dec. 11, 2003 until 1200 Dec. 11, 2003 and the hydrogen gas rate was also increased up to 40 $Nm^3$/hr. The operation continued to be smooth without any disruptions. The vessel bed pressure was being maintained at about 80-100 mbar and the temperature profile had a range of only 10° C. between the bottom and the top of the bed.

The appearance of the product continued to be good without any signs of accretions or agglomerates. As before the only exception to this was the odd piece of scale type material, which appeared to be composed of ash/char.

The standard operating conditions and results during this period were as follows.
CFB temperatures: 952° C. bottom and 940° C. top
Fluidising gas flowrate: 350 $Nm^3$/hr ($N_2$) and 40 $Nm^3$/hr
Pressure drop CFB: 80-100 mbar
Oxygen flowrate: 112 $Nm^3$/hr
$N_2$ shield gas flowrate: 30 $Nm^3$/hr
Coal Feed Rate: 430 kg/hr
Iron Ore Feed Rate: 20 kg/hr
A summary of the results is as follows:
Bed Discharge Rate: 125 kg/hr
Cyclone 3 Discharge: 15 kg/hr
Offgas Analysis

| | |
|---|---|
| $CO/CO_2$ | 11.5/9.6 = 1.2 |
| % $H_2$ | 14.1 |
| % $CH_4$ | 2.6 |

Product Analysis: (0900 Dec. 11, 2003)

| | Mass % | Fe (T) | $Fe^{2+}$ | Fe ° | % Met. |
|---|---|---|---|---|---|
| Magnetic | 9 | 58.2 | 15.5 | 42.35 | 72.8 |
| Non-Magnetic | 91 | 1.74 | | | |

Dec. 11, 2003 1200-Dec. 12, 2003 0600: Iron Ore at 40 kg/hr

Summary:

The iron ore feed rate was increased up to 40 kg/hr at 1200 on Dec. 11, 2003 and operated with this rate until 0600 Dec. 12, 2003, while the hydrogen gas rate was maintained at 40 $Nm^3$/hr and the coal rate was around 360-420 kg/hr. The operation continued to be smooth without any disruptions and the iron product discharge was highly metallised. Dust make was also low with less than 10% of the total discharge coming from the final cyclone (i.e. cyclone 3). The vessel bed ΔP was being maintained at about 90-135 mbar and the temperature profile had a range of less than 10° C. between the bottom and the top of the bed.

Results

The appearance of the product continued to be good without any signs of accretions or agglomerates.

The standard operating conditions and results during this period were as follows.
CFB temperatures: 953° C. bottom and 941° C. top
Fluidising gas flowrate: 370 $Nm^3$/hr ($N_2$) and 40 $Nm^3$/hr ($H_2$)
Pressure drop CFB: 98-130 mbar
Oxygen flowrate: 113 $Nm^3$/hr
$N_2$ shield gas flowrate: 30 $Nm^3$/hr
Coal Feed Rate: 426 kg/hr
Iron Ore Feed Rate: 40 kg/hr
A summary of the results is as follows:
Bed Discharge Rate: 190-210 kg/hr
Cyclone 3 Discharge: 15-20 kg/hr
Offgas Analysis

| | |
|---|---|
| $CO/CO_2$ | 9.9/11.4 = 0.87 |
| % $H_2$ | 12.9 |
| % $CH_4$ | 2.9 |

Product Analysis: (Dec. 12, 2003)

|  |  | Mass % | Fe (T) | $Fe^{2+}$ | $Fe°$ | % Met. | % $Fe°$ in Prod |
|---|---|---|---|---|---|---|---|
| 1500 11 Dec. 2003 | Magnetic Non-magnetic | 30 70 | 74.38 4.95 | 14.59 | 57.44 | 77.2 | 25.8 |
| 1900 11 Dec. 2003 | Magnetic Non-magnetic | 34.8 65.2 | 71.56 2.98 | 19.33 | 50.75 | 70.9 | 26.8 |
| 2300 11 Dec. 2003 | Magnetic Non-magnetic | 27.4 72.6 | 66.4 4.03 | 20.22 | 45.66 | 68.8 | 21.1 |
| 0200 12 Dec. 2003 | Magnetic Non-magnetic | 24.6 75.4 | 67.1 4.3 | 22.1 | 42.53 | 63.4 | 19.7 |
| 0600 12 Dec. 2003 | Magnetic Non-magnetic | 19.6 80.4 | 68.86 2.73 | 22.55 | 43.48 | 61.8 | 15.7 |

The high metallisation achieved (70-77%) indicates that the oxygen lance (even at its 1.9-m position) did not penetrate too far to the bottom of the bed and that there was good segregation within the bed. The lower part of the bed is iron rich. The higher part of the bed is carbon rich and this is interacting with the oxygen lance to generate heat and this heat is then transferred back into the bed by the recirculation of the solids to the lower parts of the bed. The low $CO/CO_2$ ratio in the off-gas indicates achievement of high post combustion, with the energy levels being transferred back into the bed, while maintaining high metallisation levels in the product discharge.

The iron levels in the product and the degree of metallisation indicates that the 700-mm vessel can be operated in gasification mode with up to 20-25% metallic iron content without any problems with accretions. This is a significant achievement.

Oxygen Lance Inspection (Dec. 12, 2003)

The lance was taken out of the 700-mm vessel and inspected on Dec. 12, 2003.

In summary, the lance was clean. The water cooled pipe as well as the nozzle tip had no evidence of any buildup of material.

The lance was repositioned in the vessel at a higher position i.e. 3.8-m above the distributor plate. The vessel was restarted with coal and oxygen and then once stabilised iron ore and hydrogen.

Operation with Iron Ore (110-200 kg/hr), Coal and Oxygen (Lance 4-m Height) Dec. 13, 2003-Dec. 16, 2003

Dec. 13, 2003 0600-Dec. 13, 2003 1200: Iron Ore at 110 kg/hr

Summary:

The iron ore feed rate was increased stepwise up to 110 kg/hr at 0625 on Dec. 13, 2003 and operated with this rate until 1200 Dec. 13, 2003 while the hydrogen gas rate was also increased stepwise up to 110 $Nm^3$/hr over a 2 hr period. The coal rate was around 360-400 kg/hr. The operation continued to be smooth without any disruptions and the iron product discharge from the vessel was up to 78% metallised. Dust make was also low with <10% of the total discharge coming from the final cyclone (i.e. cyclone 3). The vessel bed ΔP was being maintained at about 90-135 mbar and the temperature profile had a range of less than 5° C. between the bottom and the top of the bed.

Increasing the lance height from 1.9 m to 3.8 m did not seem to impact on the bed temperature profile. In fact, the temperature spread was less than 5° C. from top to bottom.

Results:

The appearance of the product continued to be good without any signs of accretions or agglomerates.

The standard operating conditions and results during this period were as follows.

CFB temperatures: 953° C. bottom and 951° C. top

Fluidising gas flowrate CFB 10 $Nm^3$/hr ($N_2$) at 860° C., 110 $Nm^3$/hr ($N_2$) at 740° C., 180 $Nm^3$/hr ($N_2$) at 680° C., and 110 $Nm^3$/hr ($H_2$) at 860° C.

Pressure drop CFB: 80-100 mbar

Oxygen flowrate: 110 $Nm^3$/hr $N_2$ shield gas flowrate: 30-40 $Nm^3$/hr

Coal Feed Rate: 360-400 kg/hr

Iron Ore Feed Rate: 110 kg/hr

A summary of the results is as follows:

Bed Discharge Rate: 162 kg/hr

Cyclone 3 Discharge: 16 kg/hr

Offgas Analysis

| $CO/CO_2$ | 10.9/9.6 = 1.14 |
|---|---|
| % $H_2$ | 19.6 |
| % $CH_4$ | 2.3 |

Product Analysis: (Dec. 13, 2003)

|  |  | Mass % | Fe (T) | $Fe^{2+}$ | $Fe°$ | % Met. |
|---|---|---|---|---|---|---|
| 1200 13 Dec. 2003 | Magnetic Non-magnetic | 37.8 62.2 | 76.42 2.66 | 14.98 | 59.33 | 77.6 |

With the higher oxygen lance position the uniform bed temperature profile of the lower lance was maintained. This indicates that even with the oxygen lance at the 3.8 m position the solids recirculation profile is such that enough heat is transferred back into the bottom of the bed.

The temperature profile in the vessel and the cyclones indicated that there was probably no increase in dust make with the increase in iron ore feed rate up to 110 kg/hr. The discharge from the final cyclone relative to the vessel also did not change significantly. This suggests that either the iron ore is not breaking down as much as predicted or that any fines generated are re-agglomerated in the high temperature region of the oxygen lance.

Dec. 13, 2003 1200-Dec. 16, 2003 0500: Iron Ore at 120-230 k/hr

Summary:

For the first period of this operation from 17:00 Dec. 13, 2003 to 12:00 Dec. 15, 2003 the operation rate was approximately 120 kg/h iron ore feed. This included a period of disturbance where there was no feed. The final period operated at approximately 230 kg/h iron ore feed.

The operation with 230 kg/hr iron ore feed rate was smooth without any disruptions and the iron product discharge from the CFB ranged from 48% to 78% metallised. Dust make was also low at <10% of the total discharge, coming from cyclone 3. The vessel bed ΔP was being maintained at about 80-100 mbar and the temperature profile range had now increased to about 20° C. between the bottom and the top of the bed.

Operating the vessel at the higher iron ore feed rate of 200 kg/hr increased the range of the CFB temperature profile with the bottom part of the bed now being up to 20° C. colder than the middle of the bed. The metallisation levels were also lower at the higher iron ore feed rates but they were still in the 60-80% metallisation range.

Results:

The appearance of the product continued to be good without any signs of accretions or agglomerates.

The standard operating conditions and results during this period were as follows.

CFB temperatures: 947° C. bottom and 960° C. top

FB gas heater temperature: 740° C. and 615° C. main heater

Fluidising gas flowrate CFB: 20 Nm$^3$/hr (N$_2$) at 840° C., 100 20 Nm$^3$/hr (N$_2$) at 740° C., 185 20 Nm$^3$/hr (N$_2$) at 615° C., and 140 Nm$^3$/hr (H$_2$) @ 840° C.

Pressure drop CFB: 83-96 mbar

Oxygen flowrate: 113 Nm$^3$/hr

N$_2$ shield gas flowrate: 30-40 Nm$^3$/hr

Coal Feed Rate: 380 kg/hr

Iron Ore Feed Rate: 200 kg/hr

A summary of the results is as follows:

Bed Discharge Rate: 227-286 kg/hr

Cyclone 3 Discharge: 18-24 kg/hr

Offgas Analysis (0400 hrs Dec. 15, 2003)

| | |
|---|---|
| CO/CO$_2$ | 11/10.4 = 1.06 |
| % H$_2$ | 16.5 |
| % CH$_4$ | 1.4 |

Product Analysis: (Dec. 13-15, 2003)

| | | Mass % | C (T) | Fe (T) | Fe$^{2+}$ | Fe ° | % Met. |
|---|---|---|---|---|---|---|---|
| 1700 13 Dec. 2003 | Magnetic | 40.2 | — | 75.55 | 22.1 | 51.37 | 68.0 |
| | Non-magnetic | 59.8 | — | 8.11 | | | |
| 2000 13 Dec. 2003 | Magnetic | 54.2 | 1.8 | 78.35 | 15.33 | 61.18 | 78.1 |
| | Non-magnetic | 45.8 | 80.3 | 5.03 | | | |
| 1700 13 Dec. 2003 | Cyclone 3 discharge | | | 12.89 | 2.73 | 2.47 | 19.2 |
| 2000 13 Dec. 2003 | Cyclone 3 Discharge | | | 15.74 | 3.12 | 6.67 | 42.4 |
| 0200 15 Dec. 2003 | Magnetic | 51.3 | — | 78.85 | 19.6 | 58.87 | 74.7 |
| | Non-magnetic | 48.7 | — | 7.29 | | | |
| 0500 15 Dec. 2003 | Magnetic | 57.2 | — | 77.44 | 17.27 | 57.65 | 74.4 |
| | Non-magnetic | 42.8 | — | 4.55 | | | |
| 0700 15 Dec. 2003 | Magnetic | 62.8 | 0.9 | 76.93 | 17.38 | 58.43 | 75.9 |
| | Non-magnetic | 37.2 | 72.5 | 11.25 | | | |
| 0200 15 Dec. 2003 | Cyclone 3 Discharge | | | 20.29 | 7.77 | 5.38 | 26.5 |
| 0500 15 Dec. 2003 | Cyclone 3 Discharge | | | 21.73 | 7.69 | 6.28 | 28.9 |
| 12:00 15 Dec. 2003 | Magnetic | 59.2 | — | 76.9 | 18.1 | 56.6 | 73.6 |
| | Non-Magnetic | 40.8 | — | 31.0 | 4.7 | 22.0 | 70.9 |
| 16:00 15 Dec. 2003 | Magnetic | 62.7 | 1.9 | 73.6 | 32.5 | 36.0 | 48.9 |
| | Non-Magnetic | 37.3 | 53.6 | 27.6 | 8.4 | 13.2 | 48.0 |
| 22:00 15 Dec. 2003 | Magnetic | 59.6 | — | 71.5 | 28.0 | 39.0 | 54.5 |
| | Non-Magnetic | 40.4 | — | 20.4 | 3.9 | 11.0 | 54.0 |
| 02:00 | Magnetic | 53.3 | — | 74.1 | 26.8 | 43.5 | 58.7 |

-continued

| | | Mass % | C (T) | Fe (T) | Fe$^{2+}$ | Fe ° | % Met. |
|---|---|---|---|---|---|---|---|
| 16 Dec. 2003 | Non-Magnetic | 46.7 | — | 13.7 | 3.7 | 2.8 | 20.1 |
| 04:00 16 Dec. 2003 | Magnetic | 62.7 | 1.6 | 74.4 | 29.5 | 40.0 | 53.8 |
| | Non-Magnetic | 37.3 | 63.8 | 16.8 | 5.7 | 5.4 | 32.2 |

At the high iron ore feed rates (200 kg/hr) the discharge from the vessel increased significantly while the discharge from the final cyclone only increased slightly. However, the discharge from the final cyclone relative to the vessel did not seem to change. It was further observed that the amount of fines <0.1 mm in the discharge was lower than the amount of fines <0.1 mm in the feed. This suggests that either the iron ore is not breaking down as much as predicted or that any fines generated are re-agglomerated in the high temperature region of the oxygen lance. The temperature profile through the cyclones also supports this since there were no significant increases in temperatures through the cyclone system at the higher iron ore feed rates. The product metallisation levels were maintained in the range of 68-78% during the high iron ore feed rates while the product discharge had up to 48% metallic iron.

Oxygen Lance and Vessel Inspection (Dec. 16, 2003 and Dec. 19, 2003)

The lance was taken out of the 700-mm vessel and inspected on Dec. 16, 2003. In summary, the lance was fairly clean. The water cooled pipe had a thin coating of material while the nozzle tip was relatively clean. The nature of the build up (flaky and thin) suggested that this would not lead to any operational problems.

Iron Distribution & Agglomeration

Analysis of the Brockman ore sample used as feed to the fluidised bed indicated a fines content of approximately 10.6% sub 45 micron. These units were expected to appear as output from cyclone 3 or as thickener sludge. Due to the friable nature of Brockman Ore, it was expected that additional fines would be produced during processing. It was therefore expected that the percentage of iron units exiting the system through cyclone 3 would exceed 10.6%.

It was observed that approximately 7% of the iron units input to the fluidised bed were discharged through cyclone 3, either as direct output from cyclone 3 (approximately 4%) or as output from the radial flow scrubber (approximately 3%). Analysis of the main product output from the fluidised bed indicated that an agglomeration mechanism was present within the process. This mechanism appeared to be primarily smaller particles, typically sub 100 micron particles, agglomerating to each other and to larger particles.

Many modifications may be made to the embodiments of the present invention shown in the FIGURE without departing from the spirit and scope of the invention.

The invention claimed is:

1. A circulating fluidized bed process for direct reduction of a solid metalliferous material having a particle size distribution that at least in part comprises micron sized particles, said process comprising:

supplying the metalliferous material, a solid carbonaceous material, an oxygen-rich gas and a fluidizing gas to a vessel, whereby a fluidized bed is maintained in the vessel, the fluidized bed containing a carbon-rich zone, withdrawing gas and entrained solids from an upper section of the vessel, separating solids from the withdrawn gas, and recirculating the separated solids to the vessel, and discharging a product stream from a lower section of the vessel, wherein the step of supplying the oxygen-rich gas comprises injecting the oxygen-rich gas downwardly into the carbon-rich zone using a cooled lance spaced horizontally inward from side walls of the vessel, whereby heat is generated in the carbon-rich zone by reactions between oxygen and metallized material, the solid carbonaceous material and other oxidizable solids and gases in the fluidized bed, metalliferous material is at least partially reduced in a metal-rich zone below the carbon-rich zone, and the product stream discharged from the vessel comprises the at least partially reduced metalliferous material, and wherein the process further comprises controlling agglomeration of particles by adjusting at least one of feed rate of the metalliferous material, feed rate of the carbonaceous material and feed rate of the oxygen-rich gas.

2. A process according to claim 1, comprising supplying the metalliferous material in the form of fines.

3. A process according to claim 1, comprising supplying the metalliferous material in the form of iron ore fines sized at minus 6 mm.

4. A process according to claim 1, comprising supplying the metalliferous material in the form of fines having an average particle size in the range from 0.1 to 0.8 mm.

5. A process according to claim 1, comprising supplying the metalliferous material to the vessel with a selected maximum particle size and controlling agglomeration of the particles so that 90% of the particles discharged from the lower section of the vessel as the product stream do not exceed the selected maximum particle size.

6. A process according to claim 1, comprising supplying the metalliferous material to the vessel with a selected maximum particle size and controlling agglomeration of the particles so that no more than 30% by weight of the total weight of iron units discharged from the process is carried off in an off-gas stream from the process.

7. A process according to claim 1, comprising injecting the oxygen-rich gas using a lance having a tip directed downward at up to 40 degrees from vertical, preferably at up to 15 degrees from vertical.

8. A process according to claim 1, wherein the lance is water cooled.

9. A process according to claim 1, wherein the lance has a central pipe and the process comprises supplying the oxygen-rich gas through the central pipe of the lance.

10. A process according to claim 1, wherein the lance has a lance tip and the process comprises supplying the oxygen-rich gas with sufficient velocity that a substantially solids-free zone is formed in the region of the lance tip, whereby formation of accretions that could block injection of the oxygen-rich gas is minimized.

11. A process according to claim 10, wherein the lance has a lance tip and the process comprises injecting the oxygen-rich gas with a velocity in the range 50-300 m/s.

12. A process according to claim 1, wherein the lance has a lance tip and the process comprises injecting a shrouding gas for shrouding a region of the lance tip.

13. A process according to claim 12, comprising injecting the shrouding gas into the vessel with a velocity at least 60% of the velocity of the oxygen-rich gas.

14. A process according to claim 1, wherein the lance has a lance tip that is spaced inwardly of side walls of the vessels and comprises a central pipe, and the lance also has an outer surface, and the process comprises injecting the oxygen-rich gas through the central pipe and water cooling the outer surface of the lance.

15. A process according to claim 1, comprising supplying solids and fluidizing gas to the vessel in a manner such that solids pass through the carbon-rich zone and the reducing zone.

16. A process according to claim 1, comprising maintaining the fluidized bed by supplying a downward flow of the oxygen-rich gas, an upward flow of solids and the fluidizing gas countercurrent to the downward flow of the oxygen-rich gas, and a downward flow of solids outward of the upward flow of solids and the oxygen-rich gas.

17. A process according to claim 16, wherein the heat generated in the carbon-rich zone by the reactions between oxygen and metallized material, the solid carbonaceous material and other oxidizable solids and gases heats the solids in the upward and downward flows of solids, whereby solids in the downward flow of solids transfer heat to the metal-rich zone.

18. A process according to claim 16, wherein the upward and downward flows of solids shield the side wall of the vessel from radiant heat generated by reactions between the oxygen-containing gas and the solid carbonaceous material and other oxidizable solids and gases in the fluidized bed.

19. A process according to claim 1, wherein the carbonaceous material is coal.

20. A process according to claim 1, wherein the fluidizing gas comprises a reducing gas.

21. A process according to claim 20, wherein the fluidizing gas comprises CO and $H_2$ and the amount of $H_2$ in the fluidizing gas is at least 15% by volume of the total volume of CO and $H_2$ in the gas.

22. A process according to claim 1, wherein the product stream also comprises solids other than the at least partially reduced metalliferous material, and the process further comprises separating at least a portion of the other solids from the product stream.

23. A process according to claim 22, comprising returning at least a portion of the other solids to the vessel.

24. A process according to claim 1, comprising recirculating the separated solids to the lower section of the vessel.

25. A process according to claim 1, comprising preheating metalliferous material supplied to the vessel with gas withdrawn from the upper section of the vessel.

26. A process according to claim 1, comprising treating the gas withdrawn from the upper section of the vessel and returning the treated gas to the vessel as fluidizing gas.

27. A process according to claim 1, comprising treating the gas withdrawn from the upper section of the vessel by at least one of (a) solids removal, (b) cooling, (c) $H_2O$ removal, (d) $CO_2$ removal, (e) compression, and (f) reheating, and returning the treated gas to the vessel as fluidizing gas.

28. A process according to claim 1, comprising treating the gas withdrawn from the upper section of the vessel by solids removal, returning the treated gas to the vessel as fluidizing gas, and returning the removed solids to the vessel.

29. A process according to claim 1, wherein the fluidizing gas contains a reducing gas and more than 50% of the metalliferous material is reduced.

30. A process according to claim 1, wherein the oxygen-rich gas comprises at least 90% by volume oxygen.

31. A process according to claim 1, wherein reducing gases are released from the carbonaceous material in the carbon-rich zone and the reducing gases react with metalliferous material in the metal-rich zone.

32. A process according to claim 1, comprising supplying the metalliferous material to the vessel with a selected maximum particle size and controlling agglomeration of the particles so that no more than 20% by weight of the total weight of iron units discharged from the process is carried off in an off-gas stream from the process.

33. A process according to claim 1, comprising supplying the metalliferous material to the vessel with a selected maximum particle size and controlling agglomeration of the particles so that no more than 10% by weight of the total weight of iron units discharged from the process is carried off in an off-gas stream from the process.

* * * * *